(12) United States Patent
Choi et al.

(10) Patent No.: US 11,299,207 B2
(45) Date of Patent: Apr. 12, 2022

(54) IMPACT BEAM WITH BENT STRUCTURE AND BENDING APPARATUS

(71) Applicants: Hyundai Motor Company, Seoul (KR); Kia Motors Corporation, Seoul (KR); Hyundai Steel Company, Incheon (KR)

(72) Inventors: Je-Won Choi, Gyeonggi-do (KR); Yeung-Mo Choi, Ulsan (KR); Jeong-Real Kim, Ulsan (KR); Kyoung-Su Jin, Ulsan (KR); Baek-Gu Kang, Ulsan (KR); Ji-Hwan Kim, Ulsan (KR)

(73) Assignees: Hyundai Motor Company, Seoul (KR); Kia Motors Corporation, Seoul (KR); Hyundai Steel Company, Incheon (KR)

( * ) Notice: Subject to any disclaimer, the term of this patent is extended or adjusted under 35 U.S.C. 154(b) by 140 days.

(21) Appl. No.: 16/696,556

(22) Filed: Nov. 26, 2019

(65) Prior Publication Data

US 2020/0283069 A1 Sep. 10, 2020

(30) Foreign Application Priority Data

Mar. 4, 2019 (KR) .......................... 10-2019-0024896

(51) Int. Cl.
*B60J 7/00* (2006.01)
*B62D 21/15* (2006.01)
*B62D 25/06* (2006.01)
*B21D 53/88* (2006.01)
*B21D 7/06* (2006.01)
*B62D 25/02* (2006.01)
*B60J 5/04* (2006.01)

(52) U.S. Cl.
CPC ............. *B62D 21/157* (2013.01); *B21D 7/06* (2013.01); *B21D 53/88* (2013.01); *B62D 25/06* (2013.01); *B60J 5/0479* (2013.01); *B62D 25/025* (2013.01)

(58) Field of Classification Search
CPC ....... B60R 19/34; B62D 21/152; B06B 1/183; B25B 21/02; B25D 16/006; E01F 15/143; B23K 26/08; A61B 2017/306; A61B 2018/20351; A61B 2018/20355
See application file for complete search history.

(56) References Cited

U.S. PATENT DOCUMENTS

| 9,592,721 | B1 * | 3/2017 | Kelly | ..................... B60J 5/0425 |
| 10,518,614 | B2 * | 12/2019 | Ando | ..................... B60J 5/0443 |
| 2016/0167491 | A1 * | 6/2016 | Nakaguchi | ............. B60J 5/0402 49/504 |
| 2016/0229269 | A1 * | 8/2016 | Kawabe | ................. B60J 5/0402 |

(Continued)

FOREIGN PATENT DOCUMENTS

KR 101090707 B1 12/2011

*Primary Examiner* — Kiran B Patel
(74) *Attorney, Agent, or Firm* — Mintz Levin Cohn Ferris Glovsky and Popeo, P.C.; Peter F. Corless (57) ABSTRACT

An impact beam having a bent structure is provided. The impact beam is mounted at a lateral portion of each door in a vertical direction of a vehicle body and supports the door in the vertical direction. An upper end of the impact beam extends to support a roof panel and a lower end of the impact beam extends to a lower roller mounting portion. The impact beam is bent in an L shape and a T shape based on a curvature of the door.

5 Claims, 10 Drawing Sheets

(56) References Cited

U.S. PATENT DOCUMENTS

| | | | | |
|---|---|---|---|---|
| 2016/0303959 | A1* | 10/2016 | Mori | B60R 13/04 |
| 2017/0080525 | A1* | 3/2017 | Noda | B23K 26/28 |
| 2017/0225547 | A1* | 8/2017 | Colosseo | B60J 5/0413 |
| 2017/0342767 | A1* | 11/2017 | Sakakibara | B60J 10/86 |
| 2018/0072243 | A1* | 3/2018 | Eckart | B60R 13/0243 |
| 2018/0079285 | A1* | 3/2018 | Osawa | B60J 5/0402 |
| 2018/0079286 | A1* | 3/2018 | Osawa | B60J 5/0402 |
| 2018/0186225 | A1* | 7/2018 | Charge | B60J 10/88 |
| 2018/0339576 | A1* | 11/2018 | Heppner | B60J 5/0463 |
| 2019/0176588 | A1* | 6/2019 | Jeon | B60J 5/0481 |
| 2019/0176591 | A1* | 6/2019 | Jeon | B60J 5/0416 |
| 2019/0184796 | A1* | 6/2019 | Jeon | B60J 5/0402 |
| 2019/0337365 | A1* | 11/2019 | Marchetti | B60J 5/0486 |
| 2020/0031213 | A1* | 1/2020 | Charge | B60J 10/88 |
| 2020/0101828 | A1* | 4/2020 | Oshima | B60J 5/0402 |
| 2020/0122558 | A1* | 4/2020 | Seong | B60J 10/21 |
| 2020/0180405 | A1* | 6/2020 | Blottiau | B60J 10/79 |
| 2020/0217111 | A1* | 7/2020 | Choi | B60J 5/06 |
| 2020/0238799 | A1* | 7/2020 | Jeon | B60J 5/0416 |
| 2020/0269665 | A1* | 8/2020 | Kimura | B60J 1/17 |
| 2020/0276889 | A1* | 9/2020 | Kimura | B60J 5/0404 |
| 2020/0284071 | A1* | 9/2020 | Choi | B60J 5/06 |
| 2021/0039484 | A1* | 2/2021 | Jeon | B60R 13/04 |
| 2021/0122215 | A1* | 4/2021 | Choi | B60J 5/0413 |
| 2021/0206243 | A1* | 7/2021 | Jeon | B60J 1/08 |

* cited by examiner

FIG. 1

RELATED ART

SECT a-a

FIG. 7A

RELATED ART

FIG. 7B

RELATED ART

FIG. 7C

RELATED ART

IMPACT BEAM WITH BENT STRUCTURE AND BENDING APPARATUS

CROSS-REFERENCE TO RELATED APPLICATIONS

This application claims priority under 35 U.S.C. § 119 to Korean Patent Application No. 10-2019-0024896, filed on Mar. 4, 2019, the disclosure of which is incorporated herein by reference in its entirety.

BACKGROUND

1. Field of the Invention

The present invention relates to an impact beam having a bent structure and a bending apparatus, and more particularly, to an impact beam mounted in a vertical direction of a vehicle that is bent based on a curvature of a door and then mounted on the door to absorb collision energy during a broadside collision of a B-pillarless vehicle, and to a bending apparatus which bends an impact beam in an L shape and a T shape based on the curvature of the door.

2. Description of the Related Art

Recently, sliding doors which are opened and closed laterally have been developed for vehicles. Such doors allow a disabled person to be seated in the vehicle more easily and also provide more easy loading of articles into the vehicles. Both the rear door and the front door of the vehicle may be configured as a sliding door which may be opened in opposite directions. Accordingly, a rail is mounted on a vehicle body or door and a roller is mounted at a position corresponding to the rail to allow the door to slide. Further, a B-pillar is omitted to maximize a door opening to optimize the process of entering and exiting the vehicle and loading and unloading articles.

Figure 1:
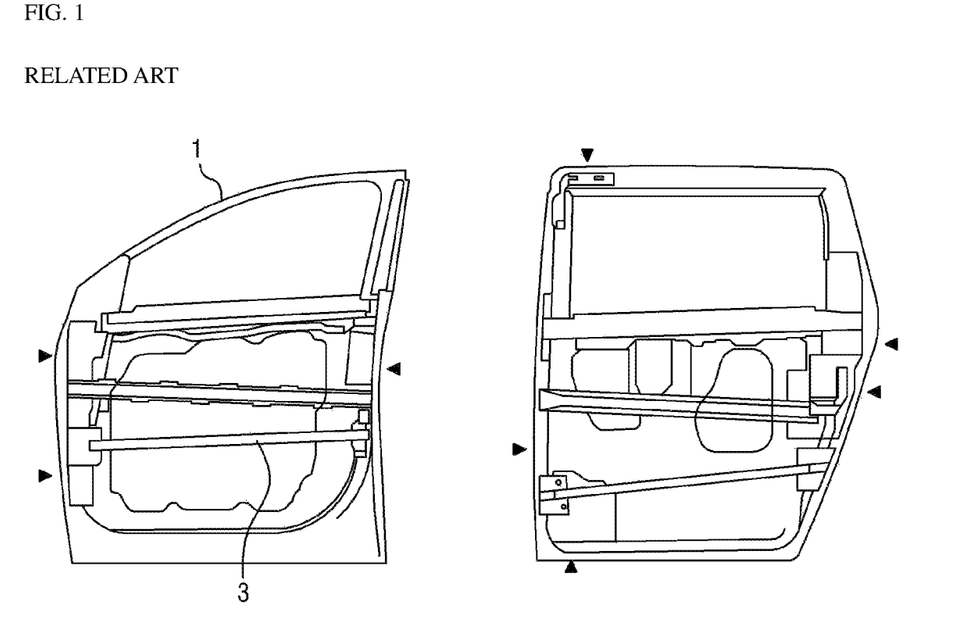
FIG. 1 is a view illustrating a state in which an impact beam in the related art is mounted on a door.

Meanwhile, as illustrated in FIG. 1 of the related art, an impact beam 3, which absorbs a collision load to minimize a degree of injury to a human body during a broadside collision, is installed on a door of a vehicle. The impact beam in the related art includes a door outer panel which has a quadrangular cross section, and the impact beam is installed horizontally on a door to absorb a load input to the door outer panel. The related art also discloses a method of extruding and forming the impact beam.

However, in the related art, as illustrated in FIG. 1, the impact beam 3 is mounted horizontally on a door 1. Therefore, in a B-pillarless vehicle from which a B-pillar is eliminated, there is no configuration that substitutes the B-pillar and absorbs impact force during a broadside collision. Additionally, the impact beam 3 is unable to be mounted in accordance with a curvature of the door 1 since the related art does not include a process of bending the impact beam 3 even though the impact beam 3 is mounted vertically.

Figure 7A:
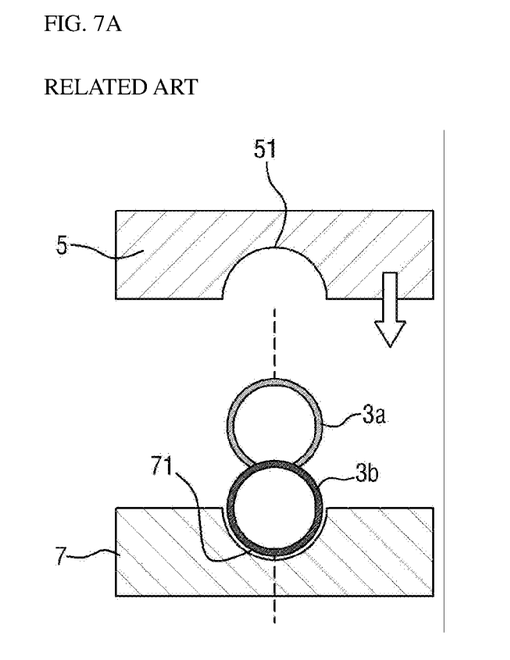
FIG. 7A is a view illustrating an apparatus for bending an impact beam in the related art.
Figure 7B:
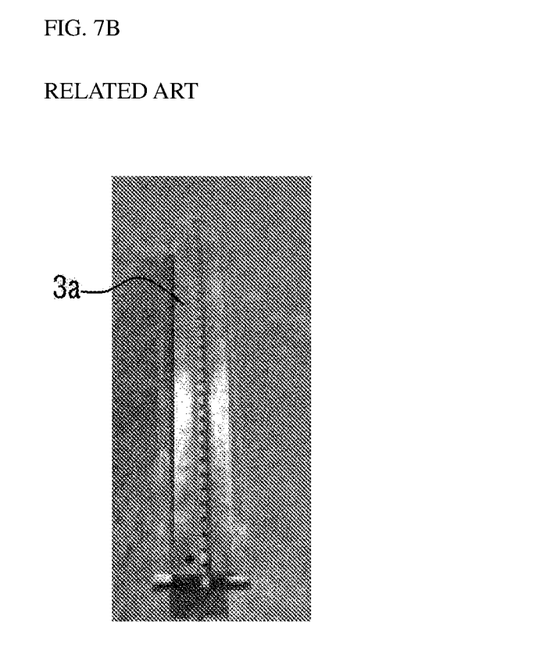
FIG. 7B is a view illustrating the impact beam in the related art before the impact beam is bent.
Figure 7C:
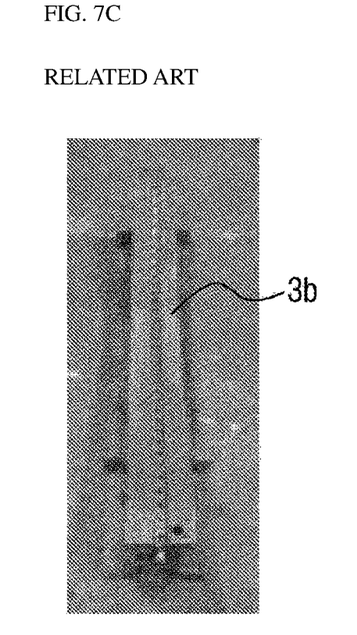
FIG. 7C is a view illustrating the impact beam in the related art which is bent by the apparatus for bending the impact beam.

Referring to FIG. 7A, an apparatus for bending an impact beam has been developed in the related art and includes an upper die 5 and a lower die 7. The impact beam is two-dimensionally bent as an impact beam 3a, which is not bent, is pressed downward by a concave portion 51, which is formed in the upper die, and a concave portion 75, which is formed in the lower die, as the upper die 5 is pressed downward. As illustrated in FIG. 7C of the related art, an impact beam 3b, which is bent only in a T shape, is produced from the impact beam 3a in FIG. 7B, and as a result, an additional bending process is required to bend the impact beam in an L shape.

SUMMARY

The present invention provides a bent structure of an impact beam in which the impact beam, which is mounted in a vertical direction of the vehicle to absorb collision energy during a broadside collision of the vehicle, may be bent based on a curvature of a door and the impact beam may extend in the vertical direction of the door. The present invention also provides a bending apparatus in which concave portions and inclined portions of an upper die and a lower die three-dimensionally bend an impact beam in an L shape and a T shape based on a curvature of a door.

An exemplary embodiment of the present invention provides an impact beam having a bent structure, including: an upper end of the impact beam that extends to support a roof panel, and a lower end of the impact beam that extends to a lower roller mounting portion, wherein the impact beam is mounted at a lateral portion of each door in a vertical direction of a vehicle body and wherein the impact beam is bent in an L shape and a T shape based on a curvature of the door.

The impact beam may further include an upper bracket having a bent portion that accommodates the upper end of the impact beam, and the upper bracket may be mounted at an upper side of the door while overlapping the impact beam. The upper bracket may be coupled to the impact beam and may support a lateral surface of the roof panel from below the roof panel. Additionally, the impact beam may include a lower bracket which has an accommodating portion that accommodates the lower end of the impact beam, and the lower bracket may be mounted at a lower side of the door while overlapping the impact beam. A lower roller may be mounted on the lower roller mounting portion positioned opposite to the accommodating portion of the lower bracket.

Another exemplary embodiment of the present invention provides an apparatus for bending an impact beam that may include: an upper die having a first concave portion therein that is recessed in a hemispheric shape, and having a first inclined portion recessed to have a predetermined angle with respect to the first concave portion; and a lower die positioned below the upper die and having, at an upper side thereof, a second concave portion that is recessed in a hemispheric shape, and having, at an outer portion thereof, a second inclined portion that has an inclination corresponding to the first inclined portion. As the upper die is pressed downward, the first inclined portion and the second inclined portion may bend, in a T shape, the impact beam positioned between the upper die and the lower die, and the first concave portion and the second concave portion may bend the impact beam in an L shape.

An interval between the first concave portion and the second concave portion may be determined based on an L-directional curvature of a door. An inclination angle of the first inclined portion and an inclination angle of the second inclined portion may be determined based on a T-directional curvature of a door. According to the present invention having the above-mentioned configuration, there is an advantage in that the impact beam, which is mounted in the vertical direction of the door, may allow the door to absorb external impact force during a broadside collision even though a B-pillar is omitted.

Additionally, according to the present invention, there is an advantage in that the upper end of the impact beam is extended and bent to support a roof panel, thereby ensuring roof strength. The impact beam may be mounted on the door in a state in which the upper end of the impact beam overlaps the upper bracket and the lower end of the impact beam overlaps the lower bracket, and as a result, connection rigidity between the door and the impact beam may be improved.

According to the present invention, the impact beam is extended and bent in accordance with a curvature of the door, and as a result, design conformability may be improved and rigidity of the door may be ensured during a broadside collision. In addition, there is an advantage in that the impact beam may be bent in the T shape and the L shape by the single upper die and the single lower die.

BRIEF DESCRIPTION OF THE DRAWINGS

The above and other features of the present invention will now be described in detail with reference to exemplary embodiments thereof illustrated in the accompanying drawings which are given herein below by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings. However, the present invention is not restricted or limited by exemplary embodiments. Like reference numerals indicated in the respective drawings refer to members which perform substantially the same functions.

Figure 2:
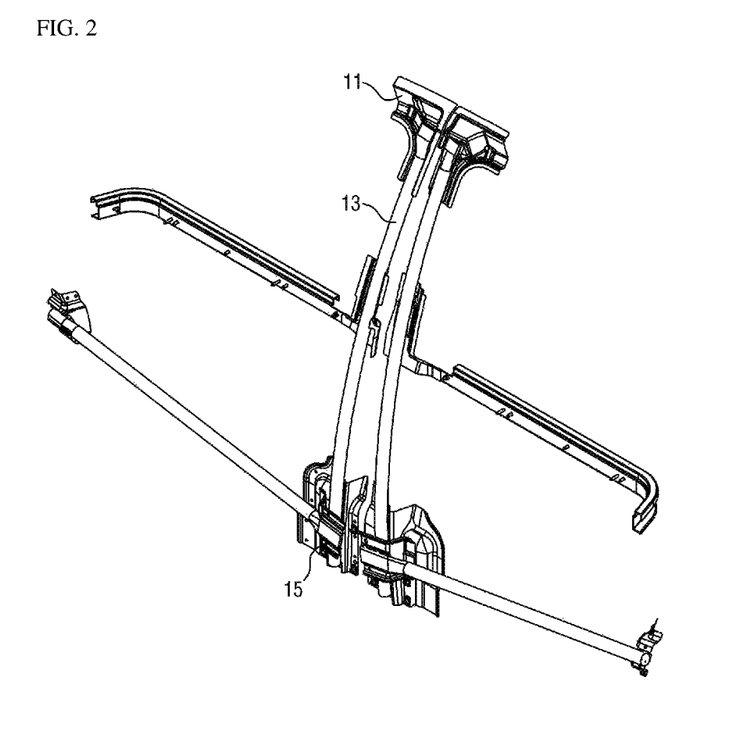
FIG. 2 is a view illustrating an impact beam according to an exemplary embodiment of the present invention.

Referring to FIG. 2, an impact beam 13 may be mounted at a lateral portion of each door 1 in a vertical direction of a vehicle body and may support the door 1 in the vertical direction. Accordingly, it may be possible to ensure collision rigidity during a broadside collision (e.g., a T-bone collision), ensure ceiling strength (e.g., roof crush resistance) for preventing collapse of a roof, and ensure bending rigidity (e.g., bending stiffness) of the door 1 which prevents deflective deformation of the door 1 that occurs when the door 1 sags downward.

Figure 3:
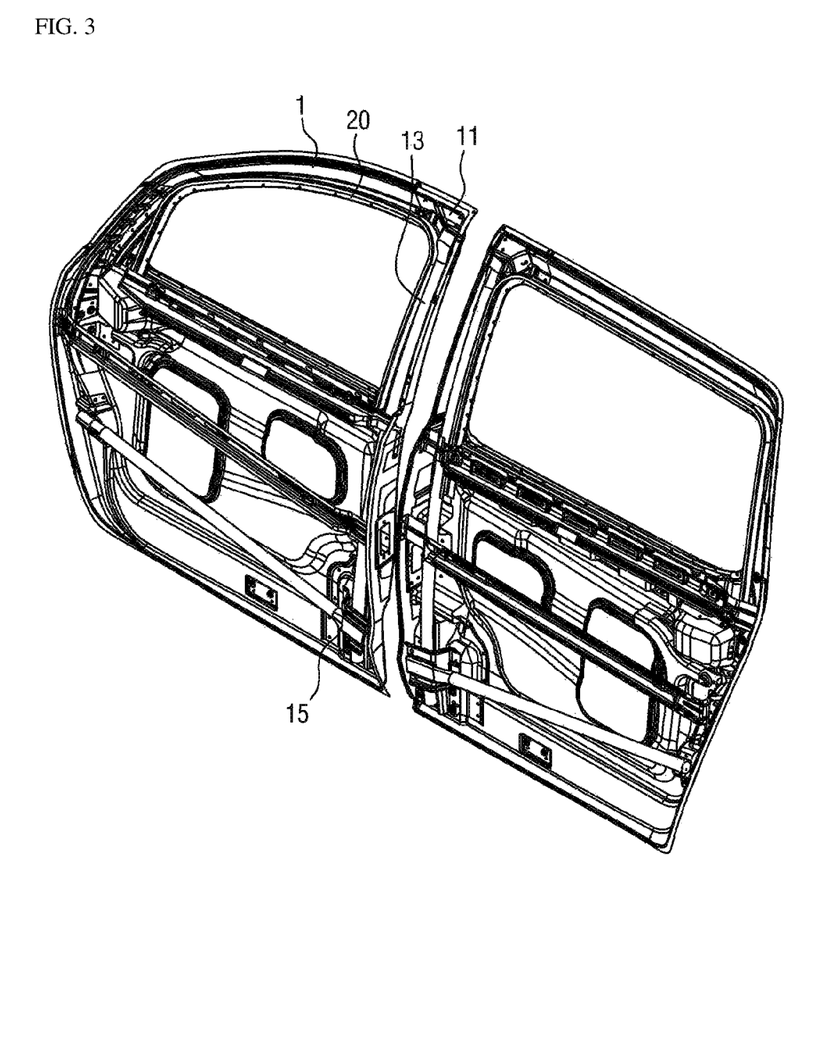
FIG. 3 is a view illustrating a state in which the impact beam according to an exemplary embodiment of the present invention is mounted on a door.

In particular, as illustrated in FIG. 3, in the case of the B-pillarless vehicle from which the B-pillar is eliminated, there is a need for a member capable of substituting the B-pillar in the related art and reinforces collision rigidity, bending rigidity, and ceiling strength. Therefore, the impact beam 13 according to the present invention may be mounted on each of front and rear doors and may be substituted for the B-pillar in the related art to ensure collision rigidity.

Figure 4A:
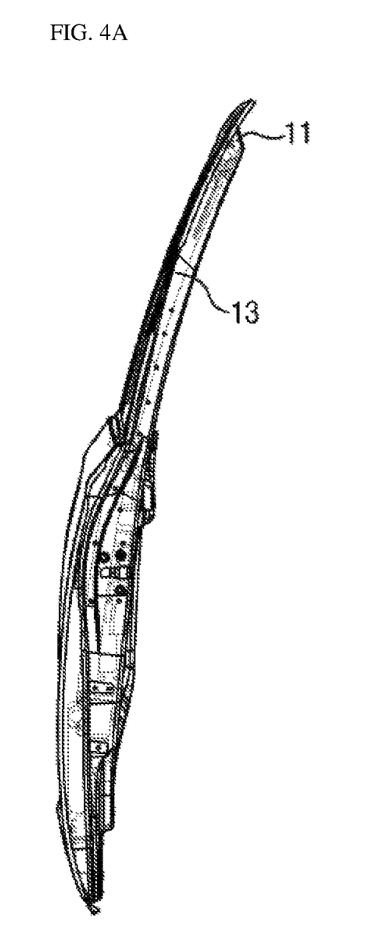
FIGS. 4A-4B are views illustrating a bent structure of the impact beam according to an exemplary embodiment of the present invention.
Figure 4B:
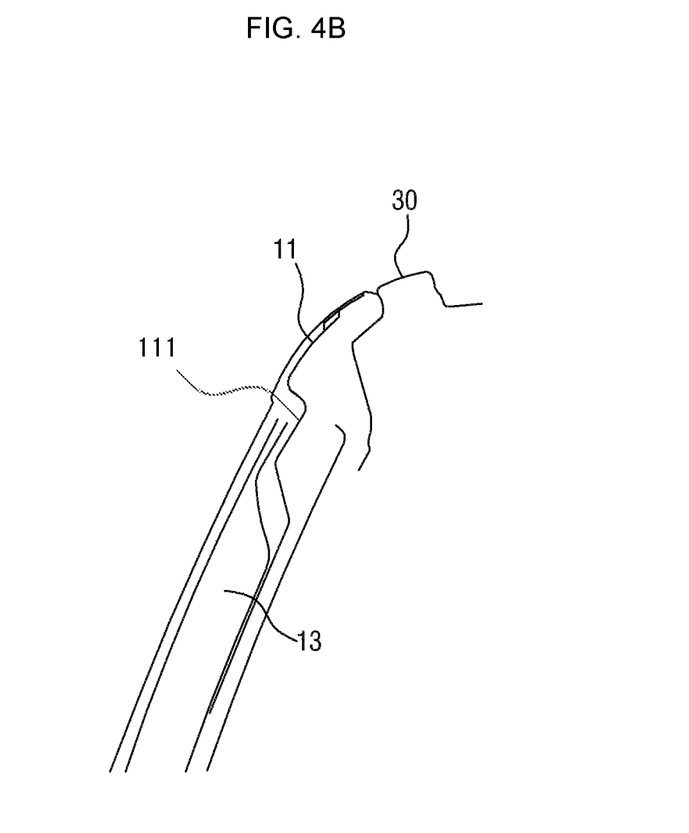

An upper end of the impact beam 13 may be extended to support a roof panel 30, and as a result, it may be possible to ensure ceiling strength. The upper end of the impact beam 13 may directly support the roof panel 30. Alternatively, as illustrated in FIGS. 4A-4B, the upper end of the impact beam 13 may be accommodated in an upper bracket 11, and the upper bracket 11 may support a lateral surface of the roof panel 30 from below the roof panel 30, and thus, the impact beam 13 and the upper bracket 11 may consequently support the roof panel 30.

The upper end of the impact beam 13 may be accommodated in a bent portion 111 of the upper bracket 11. In particular, the upper end of the impact beam 13 may be compressed and then accommodated in the bent portion 111, and the upper bracket 11 may be mounted at an upper side of the door 1 while overlapping the impact beam 13. Since the impact beam 13 may be accommodated in the bent portion 111 and mounted on the door 1 while overlapping the upper bracket 11, connection rigidity of the impact beam 13 may be increased.

The impact beam 13 may be bent to correspond to a curvature of the door 1 in an L shape (e.g., front-rear shape of the vehicle) and a T shape (e.g., width shape of the vehicle). Particularly, the impact beam 13 may be bent in the L shape and the T shape in consideration of a parting line of the door 1 and a curvature of a window frame 20, which depends on a curvature of a window mounted on the vehicle, as well as a curvature of a lateral surface of the door 1. A degree of design freedom may be improved since the impact beam 13 may be bent in accordance with layouts of peripheral components even though the layouts of the peripheral components are variously changed.

Figure 5:
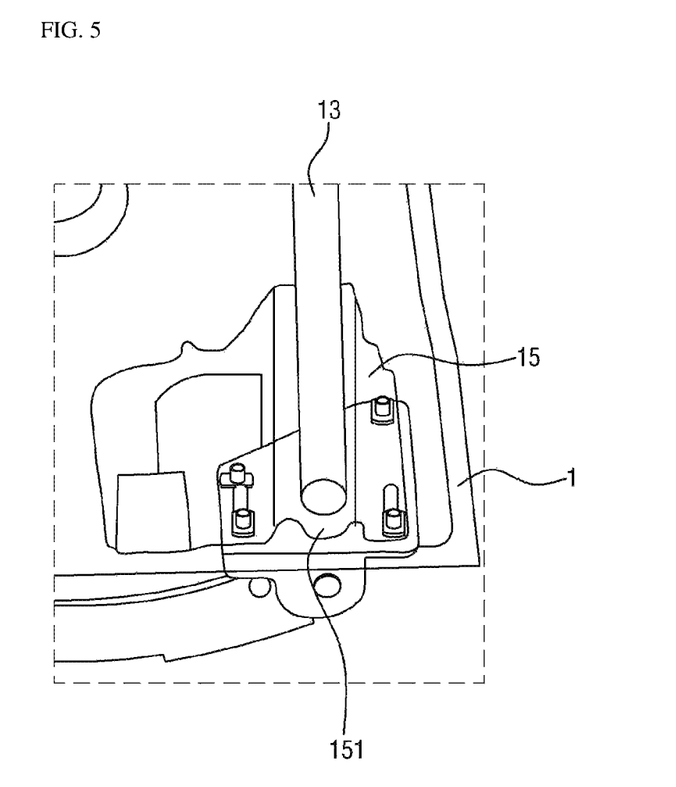
FIG. 5 is a view illustrating a state in which the impact beam is accommodated in a lower bracket according to the present invention.

FIG. 5 is a view illustrating a state in which the impact beam 13 is accommodated in a lower bracket 15 according to the present invention. A lower end of the impact beam 13 may extend to a lower roller mounting portion to ensure bending rigidity of the door 1. The lower end of the impact beam 13 may be accommodated in an accommodating portion 151 of the lower bracket 15. In particular, the impact beam 13 may be seated in the accommodating portion 151, and the lower bracket 15 may be welded on the door 1. Accordingly, the impact beam 13 and the lower bracket 15 may be mounted on the door 1 while overlapping each other.

The connection rigidity between the door 1 and the impact beam 13 may be increased since the accommodating portion 151 may be formed in the lower bracket 15 to couple the impact beam 13 to the door 1. The impact beam 13 according to the present invention may be mounted on opposite sliding doors 1 including front and rear doors that slide in opposite directions. To move the front door and the rear door, each of the opposite sliding doors 1 may include a center rail mounted at a center in the vertical direction of the door 1, a center roller mounted on the vehicle body to correspond to the center rail, a lower rail 50 mounted at a lower side of the vehicle body, and a lower roller 40 mounted at a lower side of the door 1 to correspond to the lower rail 50.

Figure 6A:
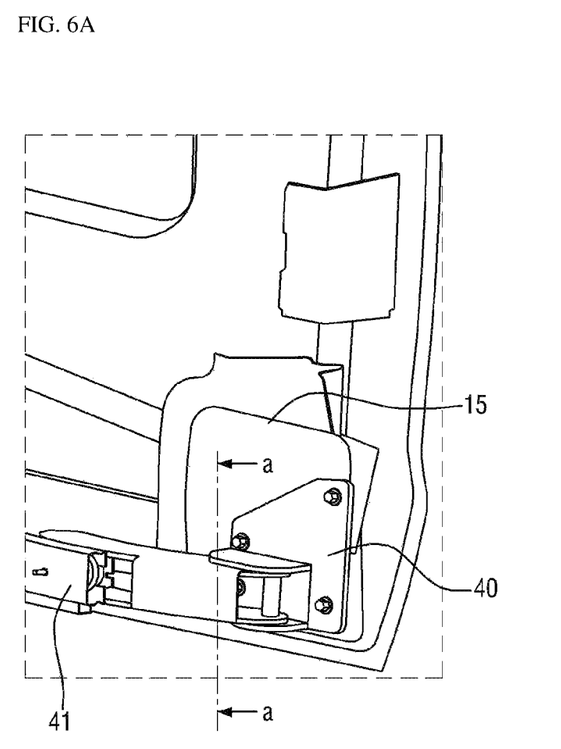
FIG. 6A is a view illustrating a state in which a lower roller according to an exemplary embodiment of the present invention is mounted on the lower bracket.
Figure 6B:
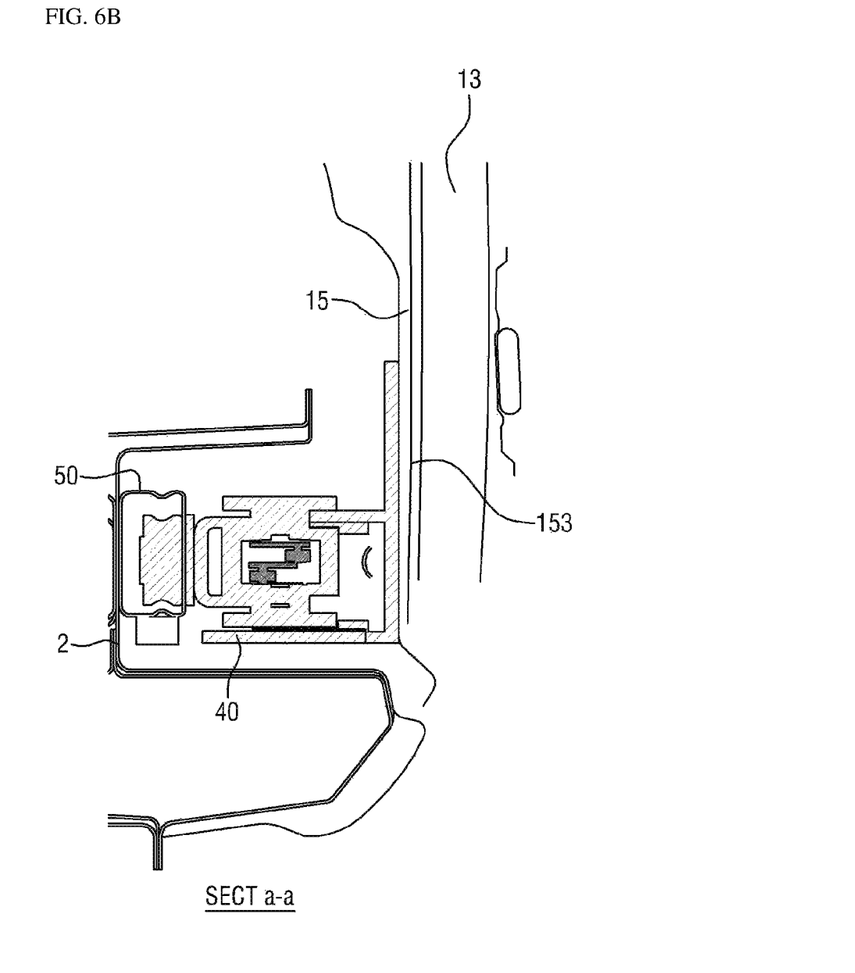
FIG. 6B is a cross-sectional view taken along line a-a in FIG. 6A according to an exemplary embodiment of the present invention.

Referring to FIGS. 6A-6B, the lower roller 40 may be mounted on the lower roller mounting portion positioned at a position opposite to the accommodating portion 151 of the lower bracket 15. The connection rigidity of the lower roller 40 may be increased since the lower roller 40 may be mounted on the lower roller mounting portion and thus mounted on the door 1 while overlapping the lower bracket 15 and the impact beam 13.

Additionally, the impact beam 13 may be bent in the T shape, the upper end of the impact beam 13 may be fixed to the upper bracket 11, the lower end of the impact beam 13 may be fixed to the lower bracket 15, and the impact beam 13 may extend in the vertical direction based on a curvature of the door 1. Accordingly, the roof panel 30 may be effectively supported at an upper side of the impact beam 13, and the overlap with a side sill 2 may be increased and support rigidity of the door 1 may be ensured at a lower side of the impact beam 13.

Figure 8A:
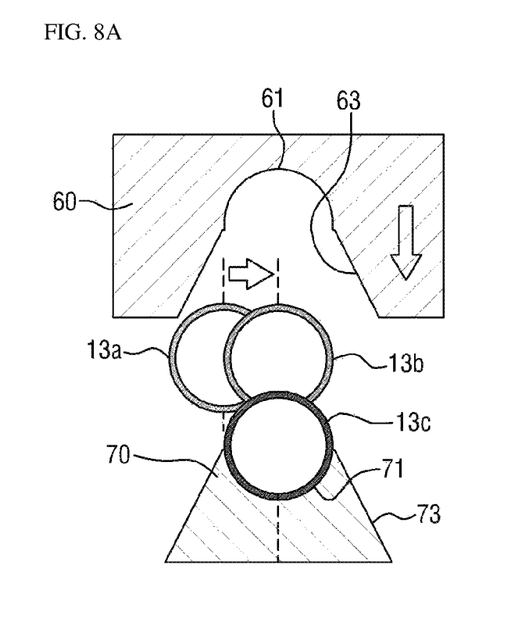
FIG. 8A is a view illustrating an apparatus for bending an impact beam according to an exemplary embodiment of the present invention.
Figure 8B:
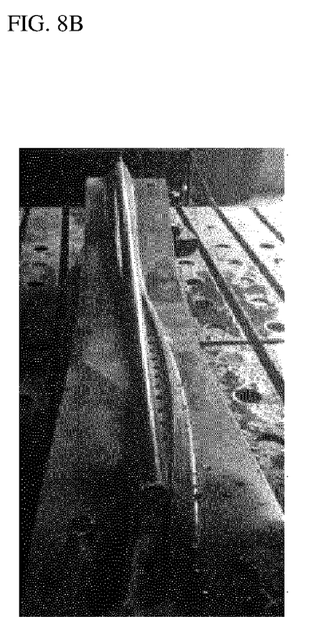
FIG. 8B is a view illustrating the impact beam according to an exemplary embodiment of the present invention before the impact beam is bent.
Figure 8C:
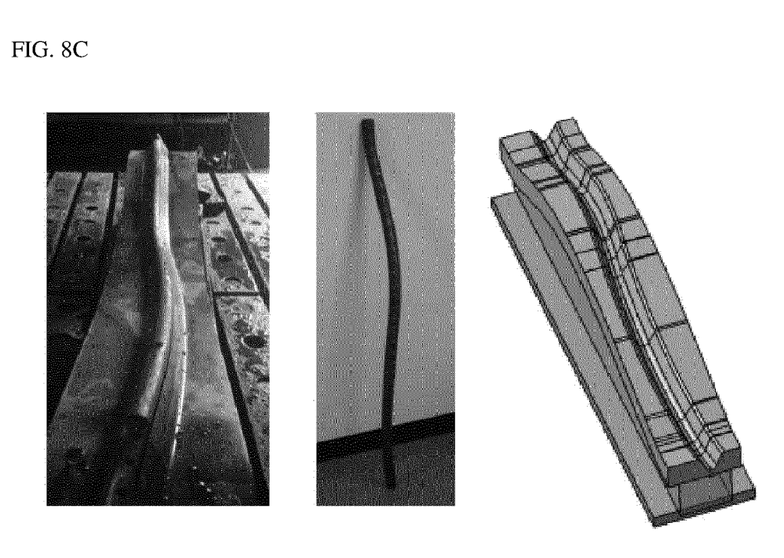
FIG. 8C is a view illustrating the impact beam according to an exemplary embodiment of the present invention which is bent by the apparatus for bending the impact beam.

FIGS. 8A-8C are views illustrating an apparatus for bending the impact beam 13 which is configured to bend the impact beam 13 according to the present invention. Referring to FIG. 8A, the apparatus for bending the impact beam 13 according to the present invention may include an upper die 60 and a lower die 70.

Particularly, the upper die 60 may include therein a first concave portion 61 which is recessed in a hemispheric shape, and a first inclined portion 63 which is recessed to have a predetermined angle with respect to the first concave portion 61. The lower die 70 may be positioned below the upper die 60. Additionally, the lower die 70 may include, at an upper side thereof, a second concave portion 71 which is recessed in a hemispheric shape, and the lower die 70 may include, at an outer portion thereof, a second inclined portion 73 which has an inclination that corresponds to the first inclined portion 63. As the upper die 60 is pressed downward, the first inclined portion 63 and the second inclined portion 73 bend, in the T shape, an impact beam 13a positioned at an initial position between the upper die 60 and the lower die 70 (e.g., the impact beam may be moved to a position denoted with 13b). The impact beam 13, positioned between the first concave portion 61 and the second concave portion 71 by the bending operations of the first inclined portion 63 and the second inclined portion 73, may be bent in the L shape by the first concave portion 61 and the second concave portion 71 as the upper die 60 moves downward (e.g., the impact beam may be moved to a position denoted with 13c), and thus, the impact beam 13 may be finally positioned in the second concave portion 71.

An interval between the first concave portion 61 and the second concave portion 71 may be determined based on an L-shaped curvature of the door 1, and an inclination angle of the first inclined portion 63 and an inclination angle of the second inclined portion 73 may be determined based on a T-shaped curvature of the door 1. The interval between the first concave portion 61 and the second concave portion 71 may be determined based on a position of the upper bracket 11 and a position of the lower bracket 15 as well as the L-shaped curvature of the door 1, and the interval between the first concave portion 61 and the second concave portion 71 may be changed in accordance with factors, such as the L-shaped curvature of the window frame 20, which are used to determine the L-shaped curvature of the impact beam 13.

The inclination angle of the first inclined portion 63 and the inclination angle of the second inclined portion 73 may also be changed by factors, such as a position of the upper bracket 11, a position of the lower bracket 15, and a T-shaped curvature of the window frame 20 as well as the T-shaped curvature of the door 1, which are used to determine the T-shaped curvature of the impact beam 13. The impact beam before being bent as illustrated in FIG. 8B may be three-dimensionally bent in the L shape and the T shape as illustrated in FIG. 8C through the bending process by the apparatus for bending the impact beam 13 according to the present invention.

An object and an effect of the present invention may be understood or may become clearer from the above description, and the object and the effect of the present invention are not restricted only by the above description. In addition, in the description of the present invention, the specific descriptions of publicly known technologies related with the present invention are omitted when it is determined that the specific descriptions may unnecessarily obscure the subject matter of the present invention.

What is claimed is:
1. An impact beam having a bent structure, comprising:
    an upper end that extends to support a roof panel; and
    a lower end that extends to a lower bracket,
        wherein the impact beam is bent in a front-rear direction of the vehicle and a width direction of the vehicle based on a curvature of each door of a vehicle, and
        wherein the impact beam is mounted at a door in a vertical direction of a vehicle body and supports the door in the vertical direction.

2. The bent structure of claim 1, further comprising:
an upper bracket having a bent portion that accommodates the upper end of the impact beam,
wherein the upper bracket is mounted at an upper side of the door while overlapping the impact beam.

3. The bent structure of claim 2, wherein the upper bracket supports a lateral surface of the roof panel from below the roof panel.

4. The bent structure of claim 1, further comprising:
a lower bracket having an accommodating portion that accommodates the lower end of the impact beam,
wherein the lower bracket is mounted at a lower portion of the door so that the impact beam and the lower bracket are mounted to overlap each other.

5. The bent structure of claim 4, wherein a lower roller is mounted on the lower bracket at a position opposite to the accommodating portion of the lower bracket.

* * * * *